US011255165B2

(12) United States Patent
Hande et al.

(10) Patent No.: US 11,255,165 B2
(45) Date of Patent: Feb. 22, 2022

(54) SUBSEA ARRANGEMENT

(71) Applicant: VETCO GRAY SCANDINAVIA AS, Sandvika (NO)

(72) Inventors: Olav Hande, Asker (NO); Morten Voldsund Karlsen, Lier (NO); Rolf Bastesen, Vinterbro (NO); Marius Rosvold, Jar (NO)

(73) Assignee: VETCO GRAY SCANDINAVIA AS, Sandvika (NO)

( * ) Notice: Subject to any disclaimer, the term of this patent is extended or adjusted under 35 U.S.C. 154(b) by 0 days.

(21) Appl. No.: 16/072,439

(22) PCT Filed: Jan. 24, 2017

(86) PCT No.: PCT/EP2017/051378
§ 371 (c)(1),
(2) Date: Jul. 24, 2018

(87) PCT Pub. No.: WO2017/129542
PCT Pub. Date: Aug. 3, 2017

(65) Prior Publication Data
US 2019/0032455 A1    Jan. 31, 2019

(30) Foreign Application Priority Data
Jan. 28, 2016  (NO) .................................. 20160134

(51) Int. Cl.
*E21B 33/035* (2006.01)
*E21B 43/013* (2006.01)
(Continued)

(52) U.S. Cl.
CPC .......... *E21B 43/013* (2013.01); *E21B 33/035* (2013.01); *F16L 23/04* (2013.01);
(Continued)

(58) Field of Classification Search
CPC .... E21B 33/035; E21B 36/003; E21B 43/013; F16L 23/04; F16L 59/14
See application file for complete search history.

(56) References Cited

U.S. PATENT DOCUMENTS

| 2,998,270 A | 8/1961 | Watkins |
| 6,079,452 A | 6/2000 | Touzel |

(Continued)

FOREIGN PATENT DOCUMENTS

| CN | 102725573 A | 6/2016 |
| CN | 102678082 A | 3/2017 |

(Continued)

*Primary Examiner* — Matthew R Buck
(74) *Attorney, Agent, or Firm* — Baker Hughes Patent Organization

(57) ABSTRACT

A subsea arrangement including a base structure; a tubular member rotatably mounted to the base structure through an annular bearing, wherein a section of the envelop surface of the tubular member is covered by a layer of thermally insulating material; a ring-shaped insulating member of open cell polymer foam mounted to the tubular member, wherein an inner edge of the insulating member is in contact with the envelop surface of the tubular member and the insulating member protrudes radially from the tubular member. The insulating member is positioned between an inner edge of the layer and the annular bearing with a first lateral surface of the insulating member in sliding contact with the inner edge of the layer and with an opposite second lateral surface of the insulating member in contact with a part of the annular bearing.

9 Claims, 1 Drawing Sheet

(51) Int. Cl.
*F16L 59/14* (2006.01)
*F16L 23/04* (2006.01)
*F16L 59/18* (2006.01)

(52) U.S. Cl.
CPC ............. *F16L 59/14* (2013.01); *F16L 59/184* (2013.01); *F16L 2201/40* (2013.01)

(56) References Cited

U.S. PATENT DOCUMENTS

| | | |
|---|---|---|
| 8,746,349 B2 | 6/2014 | Larson |
| 8,875,364 B2 * | 11/2014 | Bekkevold ................ F16L 1/26 29/237 |
| 2003/0010499 A1 | 1/2003 | Qvam |
| 2004/0214727 A1 | 10/2004 | Janoff |
| 2006/0266523 A1 | 11/2006 | Lower |
| 2009/0050328 A1 | 2/2009 | Bath |
| 2009/0260831 A1 | 10/2009 | Moksvold |
| 2012/0234410 A1 | 9/2012 | Borchgrevink |
| 2014/0105688 A1 | 4/2014 | Bastesen |

FOREIGN PATENT DOCUMENTS

| | | |
|---|---|---|
| DE | 102008062992 A1 | 7/2010 |
| EP | 2722480 A1 | 4/2014 |
| WO | 9748935 A1 | 12/1997 |

* cited by examiner

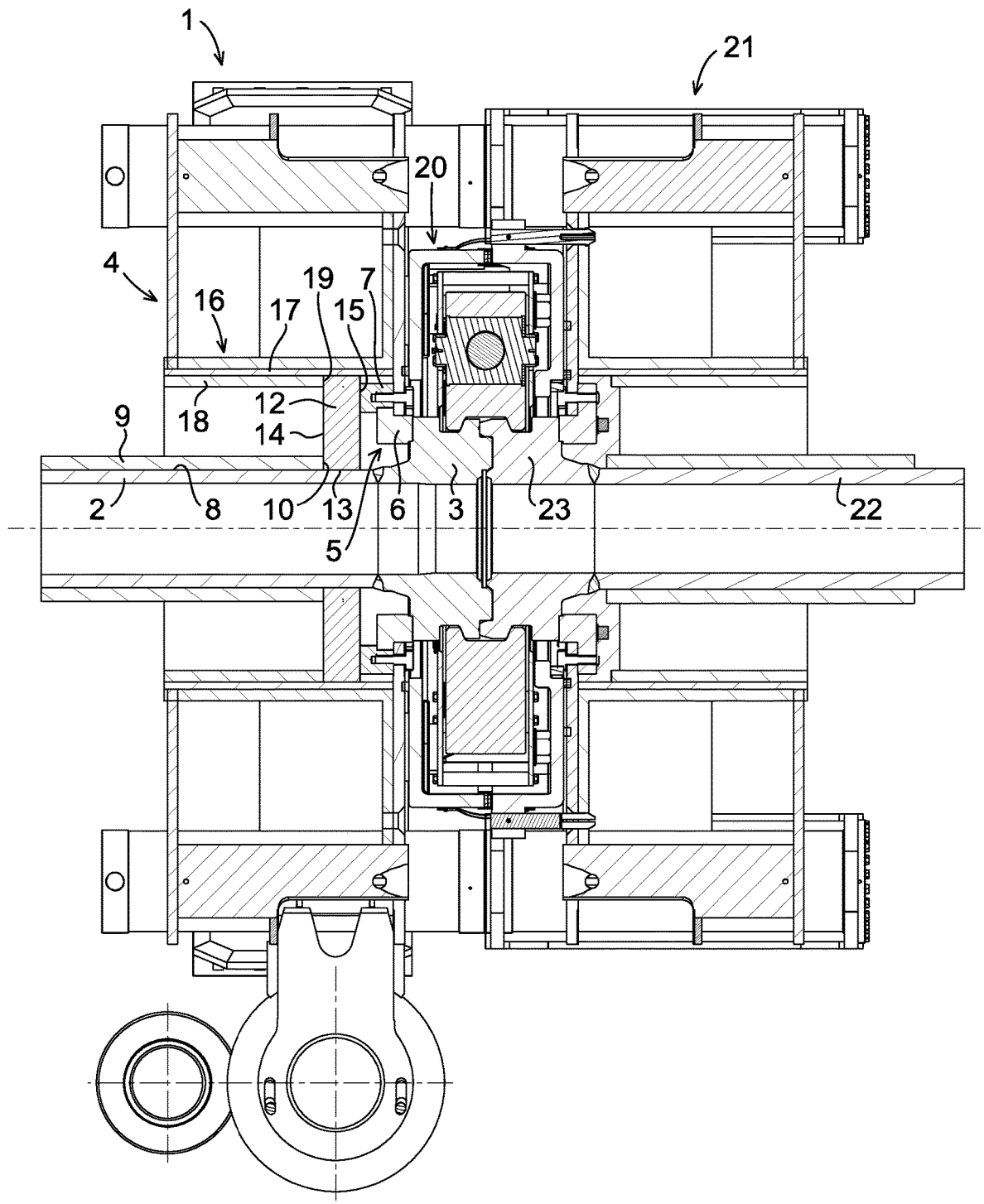

SUBSEA ARRANGEMENT

TECHNICAL FIELD

Embodiments of the invention relate to a subsea arrangement.

BACKGROUND OF THE INVENTION

At an offshore field for oil and gas exploitation, so-called jumpers or flowlines may be used for connecting manifolds and Christmas trees. At each end of the jumper or flowline there is a hub, which is attached to a termination structure. The section of the jumper or flowline that is welded to the hub is called pup piece. In order to bring a jumper or flowline hub into contact with a mating hub of a pipe termination, the jumper/flowline termination and the associated jumper/flowline hub may be moved axially towards the mating hub by means of a stroking tool, whereupon the jumper/flowline hub is secured to the mating hub, for instance by means of a clamp connector or collet connector. If the jumper or flowline is provided with bends, torques may be induced between the jumper/flowline hub and the associated jumper/flowline termination during the movement of the jumper/flowline hub towards the mating hub. In order to avoid this problem, the jumper/flowline hub may be rotatably mounted to the jumper/flowline termination through an annular bearing. Hereby, the jumper/flowline hub is allowed to swivel in the jumper/flowline termination during the stroking effected by the stroking tool, and it is thereby possible to prevent torques from being induced between the hub and the termination during the stroking.

In connection with oil and gas producing installations it is well known that rapid cooling of the production fluid during normal production and particularly during a temporary interruption of the production may result in the formation of hydrates, which may cause clogging of pipes and pipe connections. The cooling is caused by the ambient cold sea water. To delay cooling of the production fluid in case of an interruption of the production, some form of thermal insulation has to be provided on pipes, pipe couplings and other elements through which the production fluid is flowing. However, it is difficult to achieve an efficient thermal insulation at an interface between two mutually rotatable parts of a subsea arrangement, such as for instance at an annular bearing between a rotatably mounted hub and the associated termination, without obstructing the mutual rotatability between the parts.

SUMMARY OF THE INVENTION

The object of embodiments of the present invention is to achieve a new and favourable manner of achieving an efficient thermal insulation at an interface between two mutually rotatable parts of a subsea arrangement while still allowing a desired rotatability between the parts.

According to embodiments of the invention, this object is achieved by a subsea arrangement having the features defined in claim 1.

The subsea arrangement of embodiments of the present invention comprises:

a base structure;

a tubular member which is rotatably mounted to the base structure through an annular bearing, wherein a section of the envelop surface of the tubular member is covered by a layer of thermally insulating material in order to thermally insulate this section of the tubular member from ambient sea water, this layer having an inner edge facing the annular bearing; and a ring-shaped insulating member of open cell polymer foam mounted to the tubular member, wherein an inner edge of the insulating member is in contact with the envelop surface of the tubular member and wherein the insulating member protrudes radially from the tubular member, the insulating member being positioned between the inner edge of said layer and the annular bearing with a first lateral surface of the insulating member in sliding contact with the inner edge of said layer and with an opposite second lateral surface of the insulating member in contact with a part of the annular bearing.

Due to the softness and deformability of the open cell polymer foam material, the ring-shaped insulating member may be arranged between the rotatable tubular member and the base structure in the above-mentioned manner without obstructing the ability of the tubular member to rotate in relation to the base structure. The open cell polymer foam material allows the insulating member to be soaked with sea water like a sponge when the subsea arrangement is lowered into the sea for subsea installation. After the installation, the sea water contained in the porous and spongy insulating member will be heated by heat emitted from the tubular member and the annular bearing during normal operation. This heat emanates from the production fluid flowing through the tubular member. If the heat input from the production fluid is decreased or interrupted for some reason, the heat stored in the sea water contained in the insulating member will slow down the cooling of the annular bearing and the tubular member caused by the ambient cold sea water on the outside of the tubular member. Furthermore, owing to the fact that the interior of the insulating member is in fluid communication with the ambient sea, the internal pressure of the insulating member will correspond to the pressure of the ambient sea water at the depth where the subsea arrangement is located. Thus, the insulating member will not be compressed and collapse under the effect of hydrostatic pressure at great sea depths.

According to an embodiment of the invention, the insulating member is slidably mounted to the tubular member. Hereby, the insulating member may be fitted to the tubular member in a simple manner, for instance by slipping it onto the tubular member and pushing it into place against the above-mentioned part of the annular bearing before the layer of thermally insulating material is applied to the tubular member.

Further advantages as well as advantageous features of the subsea arrangement of embodiments of the present invention will appear from the following description and the dependent claims.

BRIEF DESCRIPTION OF THE DRAWINGS

With reference to the appended drawing, a specific description of embodiments of the invention cited as examples follows below. In the drawing:

FIG. 1 is a longitudinal section through a subsea arrangement according to an embodiment of the present invention, as seen with the subsea arrangement connected to a pipe termination.

DETAILED DESCRIPTION

An embodiment of a subsea arrangement 1 according to embodiments of the present invention is illustrated in FIG.

1. In the illustrated example, the subsea arrangement 1 is a termination to be used for subsea connection of an end of a first tubular member 2 to an end of a second tubular member 22, wherein a hub 3 at the end of the first tubular member 2 is configured for engagement with a corresponding hub 23 at the end of the second tubular member 22. The end of the first tubular member 2 is fixed to the subsea arrangement 1 during and after the connection of the two tubular members 2, 22 to each other, whereas the end of the second tubular member 22 is fixed to a subsea support structure 21 during and after the connection of the two tubular members 2, 22 to each other. In the illustrated example, the hub 3 of the first tubular member 2 is secured to the hub 23 of the second tubular member 22 by means of a clamp connector 20 of conventional type.

The subsea arrangement 1 is for instance a jumper or flowline termination, in which case the subsea support structure 21 may be a pipe termination of a subsea installation, such as e.g. a subsea production manifold.

In the illustrated example, the first tubular member 2 is a pup piece which for instance may be fixed to an end of a jumper or flowline, whereas the second tubular member 22 is another pup piece which for instance may be fixed to an end of a pipe. The first and second tubular members 2, 22 and the associated hubs 3, 23 are of metallic material, for instance stainless steel.

The subsea arrangement 1 comprises a base structure 4. The first tubular member 2 is rotatably mounted to the base structure 4 through an annular bearing 5 so as to allow the first tubular member 2 and the associated hub 3 to swivel in relation to the base structure 4.

In the illustrated example, the annular bearing 5 comprises a ring-shaped first bearing member 6, which is fixed to the hub 3 of the first tubular member 2, and a ring-shaped second bearing member 7, which is fixed to the base structure 4. The first and second bearing members 6, 7 are slidably connected to each other in order to allow the first bearing member 6 to rotate in relation to the second bearing member 7 and thereby allow the first tubular member 2 to rotate in relation to the base structure 4. The first bearing member 6 may be fixed to the hub 3 of the first tubular member 2 by press fit and the second bearing member 7 may be bolted to the base structure 4, as illustrated in FIG. 1.

A section of the envelop surface 8 of the first tubular member 2 is covered by a layer 9 of thermally insulating material in order to thermally insulate this section of the first tubular member 2 from ambient sea water. This layer 9 has an inner edge 10 facing the annular bearing 5. Furthermore, a ring-shaped insulating member 12 of open cell polymer foam is mounted to the first tubular member 2. The first tubular member 2 extends through a central through hole in the insulating member 12, wherein an inner edge 13 of the insulating member 12 is in contact with the envelop surface 8 of the first tubular member 2 and the insulating member 12 protrudes radially from the envelop surface 8 of the first tubular member 2. The insulating member 12 is in contact with the surroundings and it will be soaked with sea water when the subsea arrangement 1 is lowered into the sea. The sea water contained in the insulating member 12 will be heated by heat emitted from the first tubular member 2 and the annular bearing 5 during normal operation. This heat emanates from the production fluid flowing through the first tubular member 2. If the heat input from the production fluid is decreased or interrupted for some reason, the heat stored in the sea water contained in the insulating member 12 will slow down the cooling of the annular bearing 5 and the first tubular member 2 caused by the ambient cold sea water on the outside of the first tubular member 2.

In the illustrated example, the insulating member 12 has the form of a ring-shaped disc.

The insulating member 12 is positioned between the inner edge 10 of the above-mentioned layer 9 and the annular bearing 5 with a first lateral surface 14 of the insulating member 12 in sliding contact with the inner edge 10 of said layer 9 and with an opposite second lateral surface 15 of the insulating member 12 in contact, more particularly sliding contact, with a part of the annular bearing 5. In the illustrated embodiment, the second lateral surface 15 of the insulating member 12 is in contact with the above-mentioned second bearing member 7 of the annular bearing 5.

The insulating member 12 is slidably mounted to the first tubular member 2, i.e. with the inner edge 13 of the insulating member 12 in sliding contact with the envelop surface 8 of the first tubular member 2. The insulating member 12 may for instance be fitted to the first tubular member 2 by slipping it onto the first tubular member 2 and pushing it into place against the second bearing member 7 of the annular bearing 5 before the layer 9 of thermally insulating material is applied to the first tubular member 2.

In the illustrated embodiment, the first tubular member 2 extends through a tubular casing part 16 included in the base structure 4, wherein this tubular casing part 16 has a wall 17 facing the first tubular member 2. Said wall 17, or at least a part thereof, may be covered by a layer 18 of thermally insulating material in order to thermally insulate the wall 17 from ambient sea water, wherein this layer 18 has an inner edge 19 facing the annular bearing 5 and wherein said first lateral surface 14 of the insulating member 12 is in sliding contact with the inner edge 19 of this layer 18, as illustrated in FIG. 1.

The thermally insulating material of the above-mentioned first and second layers 9, 18 may be any type of insulating material suitable for forming an insulating layer on subsea pipes and other parts of subsea appliances exposed to ambient sea water. Several such insulating materials are available on the market. The insulating material is with advantage a multi-layer coating system particularly developed for subsea use, such as for instance a multi-layer coating system marketed by the company Advanced Insulation Systems under the product name ContraTherm® or a multi-layer coating system marketed by the company Trelleborg under the product name Vikotherm™.

Embodiments of the invention are not in any way restricted to the embodiments described above. On the contrary, many possibilities to modifications thereof will be apparent to a person with ordinary skill in the art without departing from the basic idea of the invention such as defined in the appended claims.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A subsea arrangement comprising:
a base structure; and
a tubular member which is rotatably mounted to the base structure through an annular bearing, wherein a section of an envelop surface of the tubular member is covered by a layer of thermally insulating material in order to thermally insulate the section of the tubular member from ambient sea water, the layer having an inner edge facing the annular bearing,
wherein:
a ring-shaped insulating member of open cell polymer foam is mounted to the tubular member, wherein an inner edge of the insulating member is in contact with the envelop surface of the tubular member and wherein the insulating member protrudes radially from the tubular member; and
the insulating member is positioned between the inner edge of the layer and the annular bearing with a first lateral surface of the insulating member in sliding contact with the inner edge of the layer and with an opposite second lateral surface of the insulating member in contact with a part of the annular bearing.

2. The subsea arrangement according to claim 1, wherein the insulating member is slidably mounted to the tubular member.

3. The subsea arrangement according to claim 1, wherein the insulating member has the form of a ring-shaped disc.

4. The subsea arrangement according to claim 1, wherein:
the tubular member extends through a tubular casing part included in the base structure, wherein the tubular casing part has a wall facing the tubular member; and
at least a part of the wall is covered by a layer of thermally insulating material in order to thermally insulate the wall from ambient sea water, wherein the layer has an inner edge facing the annular bearing and wherein the first lateral surface of the insulating member is in sliding contact with the inner edge of the layer.

5. The subsea arrangement according to claim 1, wherein the tubular member is a pup piece.

6. The subsea arrangement according to claim 1, wherein the second lateral surface of the insulating member is in sliding contact with the part of the annular bearing.

7. The subsea arrangement according to claim 1, wherein:
the tubular member has a hub at a front end of the tubular member;
the annular bearing comprises a ring-shaped first bearing member, which is fixed to the hub, and a ring-shaped second bearing member, which is fixed to the base structure and which is slidably connected to the first bearing member; and
the second lateral surface of the insulating member is in contact with the second bearing member.

8. The subsea arrangement according to claim 7, wherein the second bearing member is bolted to the base structure.

9. The subsea arrangement according to claim 1, wherein the subsea arrangement is a jumper or flowline termination.

* * * * *